United States Patent Office
3,537,838
Patented Nov. 3, 1970

3,537,838
METHOD FOR STIMULATING PLANT GROWTH
Simion Oeriu and Ion Oeriu, Bucharest, Rumania, assignors to Ministerul Industriei Chimice, Bucharest, Rumania
No Drawing. Filed July 26, 1967, Ser. No. 656,059
Claims priority, application Rumania, July 26, 1966, 51,945
Int. Cl. A01n 21/02, 9/12
U.S. Cl. 71—77                                    9 Claims

ABSTRACT OF THE DISCLOSURE

The SH-groups set free in the plant organism, by enzymes processes, by the complex derivatives of cysteine and its homologues, such as the thiazolidine carboxylic acid, its salts and derivatives, stabilized and potentiated in their activity by magnesium and lithium sulphosalicylate, by vitamin PP, by electrolytes, etc., exert an influence upon the equilibrium of nucleic acids, upon protein synthesis and secretion of phytohormones, such as the indolylacetic acid, causing the proportionate growth and development of the plants and bringing about richer harvests.

---

This invention relates to a new composition of substances that stimulate the growth and development of plants, to the process for their preparation, and to the mode of administering these products.

The methods already known for the stimulation of the growth and development of plants employ electrolytes, tracts of vegetal and animal tissues, etc. The administering of these substances raises different problems connected with their disadvantages which, besides their high cost, comprise mainly the reduced or exaggerated development of some parts of the plant to the detriment of others, their lack of a uniform action on the plant, some of them exerting an action upon the root system, some others upon the stem or upon the foliage. The present invention eliminates the disadvantages of the known stimulative substances, in that it offers a stimulant agent based on the action of substances giving out in the organism thiolic groups by an enzyme process, the product containing as active principle cysteine salts or cyclic derivatives, or derivatives of cysteine homologues, such as thiazolidine carboxylic acid, its salts and derivatives, being applied as powder or as solution, and leading to a harmonious development of the plant.

The preparation of the stimulative substances according to the invention is carried out by dissolving in water 5% by weight of cysteine hydrochloride, its salts or derivatives or those of its homologues, such as homocysteine, in the presence of 0.5% by weight of an aldehyde or a potential aldehyde, such as hexamethylenetetramine, to which 0.1% by weight folic acid is added and a stabilizer, such as 1.2% by weight of sodium benzoate, auxiliary substances being subsequently admixed as stimulants, for instance 0.5% by weight of magnesium and lithium sulphosalicylate and 1.5% by weight of sodium metabisulphite, 1.3% by weight of superphosphate, 0.05% by weight of zinc sulphate, electrolytes, manganese traces, vitamin PP traces, etc., the auixiliary substances entering into the composition of the stimulant being used totally or partially, and administered individually or together, once or repeatedly.

The method for the stimulation of the growth and development of plants according to this invention proceeds by sprinkling or moistening only the seeds of the plant, or its nursery transplant or cuttings, or the adult plant, or all of them, with a solution containing 1 g. active substance in 1000 . . . 10,000,000 ml. water, in which the vegetal product's weight is included, or by swamping some of them, such as nursery transplants or cuttings, saplings, or seedlings, with 1 g. active substance in 1 . . . 10,000, preferably in 10,250 kg. mud, or by treating the seeds with the stimulant agent as powder, homogeneously distributed in talcum or another inert substance, 1 g. active substance being the amount for 1 . . . 10,000, preferably for 10,500 kg. seed.

The invention is illustrated in the following examples:

(a) The preparation of the stimulative substance used as solution for the stimulation of the growth and development of plants.

According to the invention, the preparation of the product is achieved by dissolving in water 5% by weight of cysteine hydrochloride, its salts or derivatives or those of its homologues, such as derivatives of homocysteine, in the presence of 0.5% by weight of an aldehyde or a potential aldehyde, such as hexamethylenetetramine, 0.1% by weight of folic acid being added, and a stabilizer, such as 1.2% by weight of sodium benzoate. To this solution, stimulants, such as 0.5% by weight of magnesium and lithium sulphosalicylate, 1.5% by weight of sodium metabisulphite, may be added or not. To potentiate the active principle, some electrolytes, such as phosphorus in the form of 1.3% by weight of superphosphate, zinc in the form of 1.5% by weight of zinc sulphate, manganese traces, or vitamins, such as traces of vitamin PP, may be added or not, or added totally or partially, separately or together. The cysteine, its salts or derivatives or those of its homologues, may be substituted by their cyclic derivatives, which can set free in the plant, by an enzyme process, active-SH groups, as for instance thiazolidine carboxylic acid, its salts or derivatives, etc.; in this case the presence of an aldehyde or of a potential aldehyde, such as hexamethylenetetramine, is unnecessary.

The solution thus obtained is buffered at pH 5 . . . 6, and either tyndallized or sterilized for longer conservation or, if necessary, employed without subjecting it to tyndallization or sterilization. The resulting product is diluted, when the treatment is applied, to the active dose limits.

(b) The preparation of the product used as powder for the stimulation of the growth and development of plants is carried out either by drying (by evaporation) the solution obtained as mentioned in the preceding example, or by homogenizing the cyclic derivatives or salts of cysteine or homocysteine, such as the thiazolidine carboxylic acid, its derivatives or salts, in an amount equivalent to 5% by weight of cysteine hydrochloride, to which 0.1% by weight of folic acid, 1.2% by weight of sodium benzoate, 0.5% by weight of magnesium and lithium sulphosalicylate, 1.5% by weight of sodium metabisulphite, 1.3% by weight of superphosphate, 0.05% by weight of zinc sulphate, manganese traces, vitamins, such as PP vitamin traces, etc., are added. The resulting product is conserved in tight containers, and when processed for treatment is homogeneously distributed into talcum or another inert substance.

(c) Administering of the stimulative product.

Example 1

The active solution is dissolved in water in concentrations depending on the plant to be treated, thus;

For maize, a solution of 1 g. active principle dissolved in 25,000 . . . 250,000 ml. water is employed, in which the amount by weight of the grains necessary for 1 hectare is entering too;

For treating tomato seeds or nursery transplants, a solution of 1 g. active principle dissolved in 40,000 . . . 100,000 ml. water is employed, and in swamping tomato nursery transplants 1 g. active principle dissolved in 40 ... 100 kg. mud is used;

For school vine cuttings or saplings in nurseries, the swamping is carried out with 1 g. active principle in 10 ... 250 kg. mud, and the moistening and sprinkling with solution is made with the same concentration or with concentrations varying between 1 g. for 1,000 and 1 g. for 10,000,000 ml. water.

Example 2

An extraradicular treatment may be carried out by sprinkling at different growth and development stages of the plant, and a combined treatment employing the one or the other of the described processes may be used, applying for all the treatments the same concentration or varying this concentration, as for example treating the tomato seeds with 1 g. to 40,000 ml. water, and employing for the phase sprinkling 1 g. for 100,000 ml. water to 1 g. for 400,000 ml. water, etc.

Example 3

25 to 30 kg. maize grains necessary for sowing 1 hectare are moistened by sprinkling with a solution containing 1 g. active principle in 25,000 ... 250,000 ml., employing the amount of liquid that the mentioned amount of seeds can absorb. The treated seeds are shovelled in order to ensure the uniform distribution of the liquid, they are conserved in cool rooms until near to germination and are fanned before sowing.

Example 4

The stimulant product in the form of powder is distributed homogeneously in talcum or another inert substance. In this form, it may be admixed with pesticides applied to the seeds, the dose of the stimulant depending on the plant to be treated.

Thus for maize 1 g. active principle for 25 ... 100 kg. grains or more is employed.

The process of stimulating the growth and development of the plants according to the invention offers the following advantages;

It leads to a harmonious development of the plant, the root system is strongly ramified and developed, this ensuring conditions of abundant feeding, the stem is more vigorous, the foliage very rich, thus making certain a strong assimilation and bringing about a richer harvest;

It exerts an action upon the sexual apparatus, this action being attested when sprinkling in the inflorescence stage;

It gives the plant a higher weather resistance;

It has an action on the nucleic acids and on protein synthesis, increasing the values of some aminoacids having a role in growth, e.g. methionine, valine and glutemine; of amino acids having a supporting action, e.g. lysine and of those constituting a nitrogen reserve, e.g. glutamic and asparagic acids, etc.;

In some cases, an accumulation of glucosides, such as glucose and fructose occurs;

It produces an increase of the hormone activity, such as that of the indolyl acetic acid, etc., and in some plants, such as rice (treated), it brings about an increase in vitamins, such as for example vitamin $B_1$, etc.

What we claim is:

1. In a process for stimulating growth and development of a plant which comprises applying to the plant a stimulating amount of a composition comprising folic acid and sodium benzoate in addition to essential active ingredient, the improvement wherein the essential active ingredient, in salt-free form, is an active substance selected from the group consisting of (a) product in aqueous medium of cysteine and aldehyde, (b) product in aqueous medium of homocysteine and aldehyde and (c) thiazolidine carboxylic acid.

2. A process according to claim 1 wherein the aldehyde is in the form of hexamethylenetetramine.

3. A process according to claim 2 wherein the active substance, in salt-free form, is that defined as (a).

4. A process according to claim 1 wherein the active substance, in salt-free form, is that defined as (c).

5. A process according to claim 1 wherein the composition is an aqueous solution containing 1 gram of the active substance per one to ten thousand liters of water.

6. A process according to claim 1 wherein the composition is in powder form, the active substance being homogeneously distributed in an inert substance.

7. A process according to claim 6 wherein 1 gram of the active substance is applied to from 1 to 10,000 kilograms of seed.

8. A process acording to claim 7 wherein 1 gram of active substance is applied to from 10 to 500 kilograms of seed.

9. A process according to claim 1 which comprises swamping the plant with mud containing one gram of the active substance for each 10 to 250 kilograms of mud.

References Cited

UNITED STATES PATENTS 2,738,299  3/1956  Frost et al. _____ 424—319

JAMES O. THOMAS JR., Primary Examiner

U.S. Cl. X.R.

47—2; 71—82, 84, 90, 02, 115